(12) United States Patent
Smith et al.

(10) Patent No.: US 9,376,227 B2
(45) Date of Patent: Jun. 28, 2016

(54) BALER BRAKE DRUM LOCKING MECHANISM

(71) Applicant: CNH AMERICA LLC, New Holland, PA (US)

(72) Inventors: Kevin M. Smith, Narvon, PA (US); Scott C. Simmons, Lititz, PA (US); Brian T. Wolf, Coatesville, PA (US)

(73) Assignee: CNH Industrial America LLC, New Holland, PA (US)

( * ) Notice: Subject to any disclaimer, the term of this patent is extended or adjusted under 35 U.S.C. 154(b) by 634 days.

(21) Appl. No.: 13/800,578

(22) Filed: Mar. 13, 2013

(65) Prior Publication Data

US 2014/0261021 A1    Sep. 18, 2014

(51) Int. Cl.
*B65B 13/04* (2006.01)
*B23P 6/00* (2006.01)
*A01F 15/07* (2006.01)

(52) U.S. Cl.
CPC ............ *B65B 13/04* (2013.01); *A01F 15/0715* (2013.01); *B23P 6/00* (2013.01); *A01F 2015/072* (2013.01); *Y10T 29/4973* (2015.01)

(58) Field of Classification Search
CPC ...... A01F 15/00; A01F 15/071; A01F 15/085; A01F 2015/072; A01F 2015/0725; B65B 41/12; B65B 11/00
See application file for complete search history.

(56) References Cited

U.S. PATENT DOCUMENTS

| 6,164,050 A | 12/2000 | Vande Ryse et al. |
| 6,247,291 B1 | 6/2001 | Underhill |
| 6,651,408 B1 | 11/2003 | McClure |
| 6,823,646 B2 * | 11/2004 | McClure ............ A01F 15/0715 100/5 |
| 7,900,427 B2 | 3/2011 | Chapon et al. |
| 7,908,822 B2 | 3/2011 | McClure |
| 2004/0159074 A1 | 8/2004 | McClure et al. |
| 2008/0041016 A1 | 2/2008 | Viaud et al. |

FOREIGN PATENT DOCUMENTS

| EP | 1872648 A1 | 2/2008 |
| GB | 2228246 A | 8/1990 |

* cited by examiner

*Primary Examiner* — Hemant M Desai
*Assistant Examiner* — Tanzim Imam
(74) *Attorney, Agent, or Firm* — Patrick M. Sheldrake

(57) ABSTRACT

A net dispensing assembly in a baler includes a net roll support tube configured to hold the net roll and a brake drum assembly coupled to the net roll support tube and configured to rotate about the net roll support tube and apply tension to the net wrapping dispensed from the net roll. The net dispensing assembly also includes a pivoting element configured to move the net roll support tube between an operating position and a load-unload position. The net dispensing assembly further includes a locking mechanism coupled to the brake drum assembly and configured to prevent the brake drum assembly from rotating in a direction opposite the operating direction when the net roll support tube is in at least one of (i) the load-unload position and (ii) the operating position.

16 Claims, 8 Drawing Sheets

BALER BRAKE DRUM LOCKING MECHANISM

TECHNOLOGY FIELD

The present disclosure relates generally to installation and removal of net rolls in a baler, and particularly to a brake drum locking mechanism to facilitate installation and removal of net rolls in a baler.

BACKGROUND

Agricultural balers have been used to consolidate and package crop material to facilitate the storage and handling of the crop material for later use. Typically, a mower-conditioner cuts and conditions the crop material for windrow drying in the sun. When the cut crop material is properly dried, a baler, for example a round baler, the most frequently used in industry, travels along the windrows to pick up the crop material and form the material into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by net wrapping or other wrapping such as plastic wrapping and wire. After the round bale is wrapped, the back of the baler, or tailgate, opens and the wrapped bale is discharged.

Net wrapping is fed into the baler off a net roll and into a net wrapper assembly, conventionally located in the front of the baler. In some conventional balers, net rolls are manually installed and removed from the balers by an operator. During installation of the net roll in these conventional balers, the operator lifts the net roll, which is typically wrapped around a net roll tube (e.g., cardboard tube), and slides the net roll onto a net roll support tube while the net roll support tube is in a loading position. Additionally, once on the net roll support tube, the net roll tube is rotated in the operational direction as the net wrapping is manually threaded into the net wrapper assembly and the net roll is then moved into an operating position. As the baler forms, bounds, and distributes the bale, the net wrapping is removed from the net roll until the net roll is depleted and needs to be replaced by a new net roll, which may be stored on the baler (e.g., at the rear of the baler at the tailgate). During removal of the net roll, the operator manually removes the net roll tube (depleted net roll) from the net roll support tube, acquires a stored net roll and installs the new net roll onto the net roll support tube. The manual installation and removal of the net rolls may be cumbersome and time consuming. An improved method and system for installation and removal of the net rolls is needed.

SUMMARY

Embodiments of the present invention are directed to a baler that includes a net feeding assembly and a net dispensing assembly configured to dispense net wrapping from a net roll to the net feeding assembly. The net dispensing assembly includes a net roll support tube configured to hold the net roll and a brake drum assembly coupled to the net roll support tube and configured to rotate about the net roll support tube and apply tension to the net wrapping dispensed from the net roll. The net dispensing assembly also includes a pivoting element configured to move the net roll support tube between an operating position and a load-unload position. The net dispensing assembly further includes a locking mechanism coupled to the brake drum assembly and configured to prevent the brake drum assembly from rotating in a direction opposite the operating direction when the net roll support tube is in at least one of (i) the load-unload position and (ii) the operating position.

According to one embodiment of the invention, the locking mechanism is further configured to provide for rotation of the brake drum assembly in the operating direction when the net roll support tube is in the load-unload position.

According to another embodiment of the invention, the locking mechanism includes a latch coupled to a brake drum on the brake drum assembly and the latch is configured to prevent the brake drum assembly from rotating in the direction opposite the operating direction by engaging a stationary portion of the net dispensing assembly when the net roll support tube is in the load-unload position.

According to an aspect of an embodiment, the latch is configured to automatically engage the portion of a net dispensing assembly frame when the net roll support tube is in the load-unload position.

According to another aspect of an embodiment, the latch further comprises a protrusion extending from a latch base and the protrusion is configured to engage the stationary portion of the net dispensing assembly to prevent the brake drum assembly from rotating in the direction opposite the operating direction when the net roll support tube is in the load-unload position.

In one embodiment, the locking mechanism further includes a spring element configured to apply a spring force to cause the latch to move in a first latch direction and prevent the brake drum assembly from rotating in the direction opposite the operating direction when the net roll support tube is in the load-unload position. The stationary portion of the net dispensing assembly is configured to cause the latch to move in a second latch direction and provide for rotation of the brake drum assembly in the operating direction when the net roll support tube is in the load-unload position.

In another embodiment, the latch is rigid and is configured to engage the stationary portion and prevent the brake drum assembly from rotating when the net roll support tube is in the load-unload position. The latch is configured to disengage from the stationary portion and allow the brake drum assembly to rotate when the net roll support tube is moved a distance away from the load-unload position.

According to one aspect of an embodiment, the latch is coupled to the brake drum assembly. According to another aspect of an embodiment, the latch is integral with the brake drum assembly.

Embodiments of the present invention are directed to a net dispensing assembly that includes a net roll support tube configured to hold the net roll and a brake drum assembly coupled to the net roll support tube and configured to rotate about the net roll support tube and apply tension to the net wrapping dispensed from the net roll. The net dispensing assembly also includes a pivoting element configured to move the net roll support tube between an operating position and a load-unload position. The net dispensing assembly further includes a locking mechanism coupled to the brake drum assembly and configured to prevent the brake drum assembly from rotating in a direction opposite the operating direction when the net roll support tube is in at least one of (i) the load-unload position and (ii) the operating position.

According to one embodiment of the invention, the locking mechanism is further configured to provide for rotation of the brake drum assembly in the operating direction when the net roll support tube is in the load-unload position.

According to another embodiment of the invention, the locking mechanism includes a latch coupled to a brake drum on the brake drum assembly and the latch is configured to prevent the brake drum assembly from rotating in the direction opposite the operating direction by engaging a stationary portion of the net dispensing assembly when the net roll support tube is in the load-unload position.

According to an aspect of an embodiment, the latch is configured to automatically engage the portion of a net dispensing assembly frame when the net roll support tube is in the load-unload position.

According to another aspect of an embodiment, the latch further includes a protrusion extending from a latch base and the protrusion is configured to engage the stationary portion of the net dispensing assembly to prevent the brake drum assembly from rotating in the direction opposite the operating direction when the net roll support tube is in the load-unload position.

In one embodiment, the locking mechanism further includes a spring element configured to apply a spring force to cause the latch to move in a first latch direction and prevent the brake drum assembly from rotating in the direction opposite the operating direction when the net roll support tube is in the load-unload position. The stationary portion of the net dispensing assembly is configured to cause the latch to move in a second latch direction and allow the brake drum assembly to rotate in the operating direction when the net roll support tube is in the load-unload position.

In another embodiment, the latch is rigid and is configured to engage the stationary portion and prevent the brake drum assembly from rotating when the net roll support tube is in the load-unload position. The latch is configured to disengage from the stationary portion and allow the brake drum assembly to rotate when the net roll support tube is moved a distance away from the load-unload position.

According to one aspect of an embodiment, the latch is fixedly coupled to the brake drum assembly. According to another aspect of an embodiment, the latch is integral with the brake drum assembly.

Embodiments of the present invention are directed to a method of replacing a net roll in a baler that includes positioning a net roll support tube and a brake drum assembly in a load-unload position and causing a locking mechanism coupled to the brake drum assembly to automatically engage a stationary portion of a net wrapping assembly when the net roll support tube is in the load-unload position. The method also includes using the locking mechanism to prevent the brake drum assembly from rotating in a direction opposite an operating direction when the locking mechanism engages the stationary portion and removing a net roll tube from the brake drum assembly and the net support tube when the net roll support tube is in the load-unload position. The method further includes placing a replacement net roll on the brake drum assembly and the net support tube and dispensing a portion of the net wrapping from the replacement net roll on the net roll support tube by rotating the net roll and the brake drum assembly in the operating direction when the net roll support tube is in the load-unload position.

According to one embodiment of the invention, using the locking mechanism to prevent the brake drum assembly from rotating in a direction opposite an operating direction further includes applying a spring force to cause the locking mechanism to move in a first locking mechanism direction and prevent the brake drum assembly from rotating in the direction opposite the operating direction. Dispensing the portion of the net wrapping from the replacement net roll further includes causing the locking mechanism to move in a second locking mechanism direction and allow the brake drum assembly to rotate in the operating direction.

According to one embodiment of the invention, the method further includes causing the locking mechanism coupled to the brake drum assembly to automatically engage the stationary portion of the net wrapping assembly when the net roll support tube is in the operating position.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Figure 1:
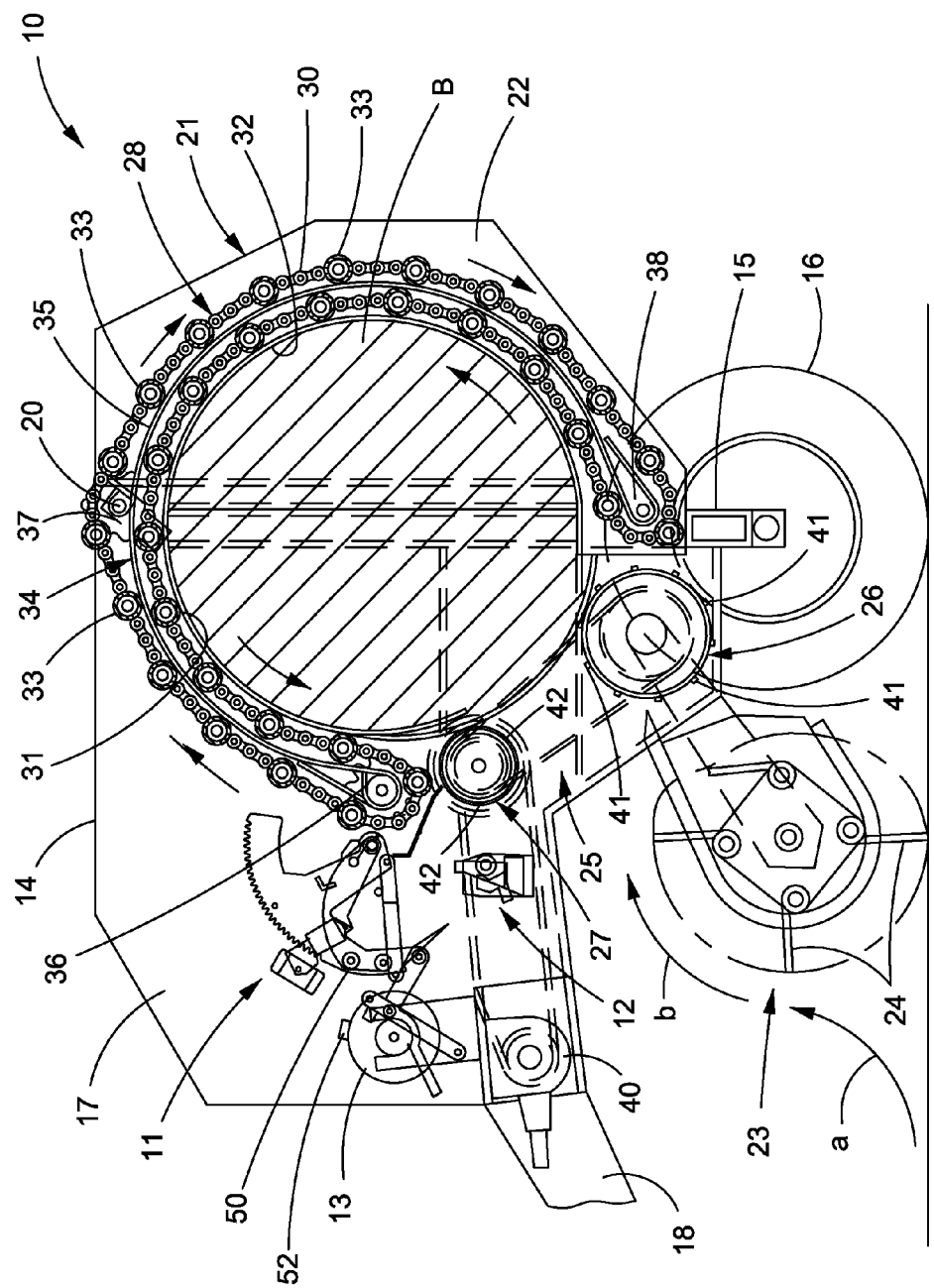
FIG. 1 illustrates an exemplary round baler for use with embodiments of the present invention.

Conventional balers include a brake drum assembly coupled to the net roll support tube. The brake drum assembly includes one or more net roll engaging features (e.g., teeth or grippers) that engage the net roll tube to allow a desired tension to be applied to the net during operation when a braking force is applied on the brake drum. As described above, during removal of the net roll, the operator manually removes the net roll tube (the depleted net roll) from the net roll support tube. Removing the net roll tube from the net roll support tube includes disengaging the net roll tube from net roll engaging features (e.g., gripping elements) on the brake drum assembly before sliding the net roll tube off of the net roll support tube.

Typically, the net roll tube in these conventional balers is disengaged from the net roll engaging features by: (i) locking the brake drum assembly with a locking pin to prevent the brake drum assembly from rotating; and (ii) rotating the net roll tube in the opposite direction of the operational direction. The location of the locking pin in these conventional balers is at an opposite side of the bailer from the location where the operator disengages the net roll tube from the net roll engaging features. Therefore, removal of the net roll tube typically requires an operator to walk from one side of the baler (e.g., to engage the locking pin) to the opposite side of the baler (e.g., to disengage the net roll tube from the net roll engaging features). Further, during installation of the new net roll, the locking pin must be disengaged to allow the net roll tube to rotate in the operational direction as the net wrapping is manually threaded into the net wrapper assembly. The location of the locking pin is also different from the location where the operator threads the net wrapping into the net wrapper assembly. Therefore, installation of the net roll tube also includes performing an additional step (disengaging the pin) and moving between different locations on the baler.

Embodiments of the present invention provide an improved system and method for installation of net rolls in a baler and removal of net rolls from the baler. Embodiments provide a brake drum locking mechanism to allow an operator to remove and install net rolls on the baler without having to move between different sides of the baler. Embodiments of the invention provide a brake drum locking mechanism which allows rotation of the net roll tube in the operational direction to allow threading of the net wrapping into the net wrapper assembly while preventing rotation in the opposite direction of the operational direction to help disengage the net roll tube from gripping features on the brake drum assembly. Embodiments of the invention utilize the different positions of the support tube assembly (e.g., the loading position and the operating position) to engage and disengage the net roll tube from the net roll engaging features on the brake drum assembly.

Embodiments of the present invention are particularly well suited for, but in no way limited to, use with agricultural balers, such as round balers, for example. Agricultural balers, such as round balers, are well known in the agricultural industry, and the instant invention can be used with substantially any of such machines.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown). FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net wrapping, fed from a net roll 13 through a net feeding assembly 50.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in patents. For illustrative purposes reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2:
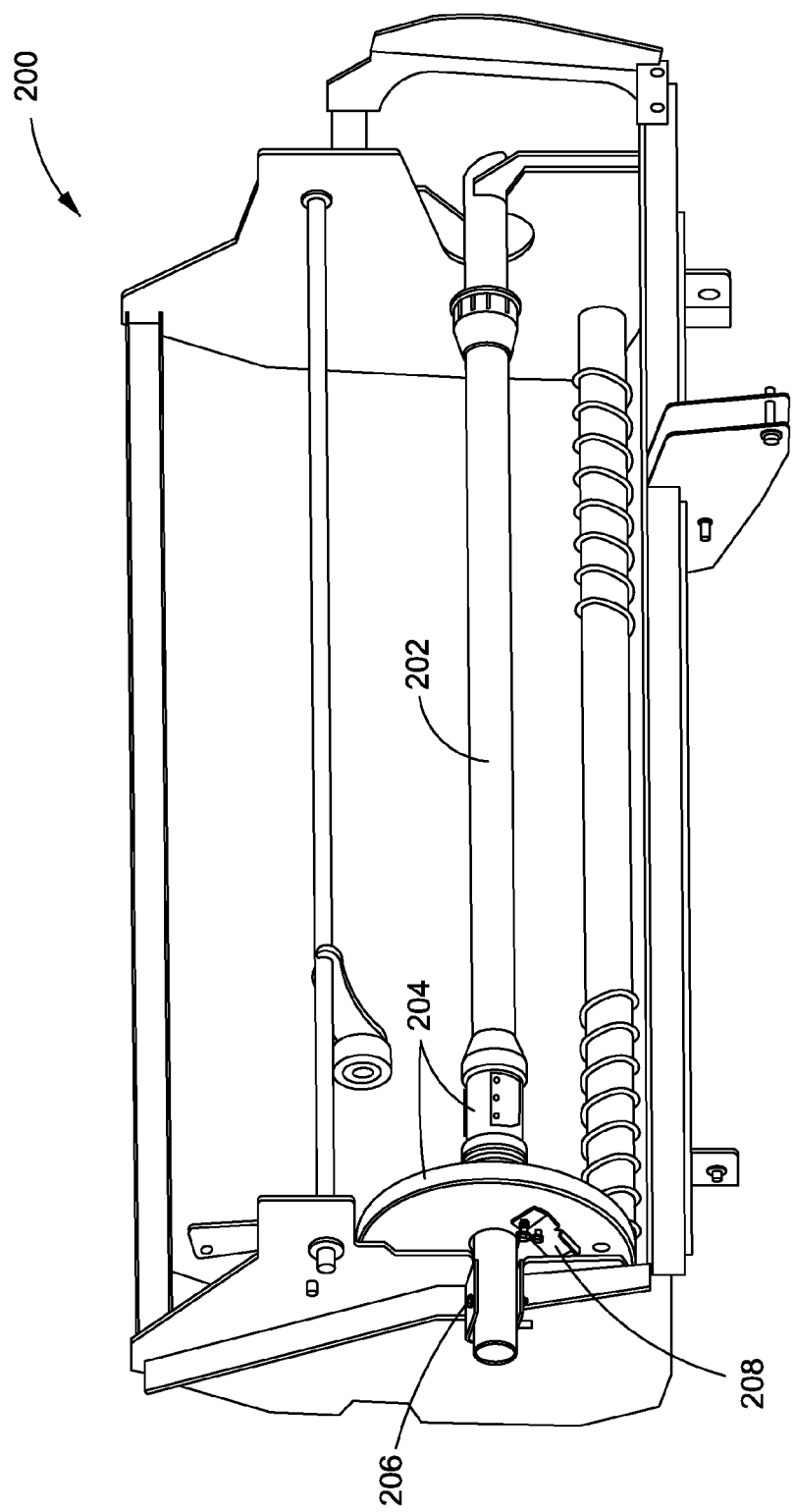
FIG. 2 is a perspective view of an exemplary net dispensing assembly with a net roll support tube in an operating position for use with embodiments of the present invention.
Figure 3:
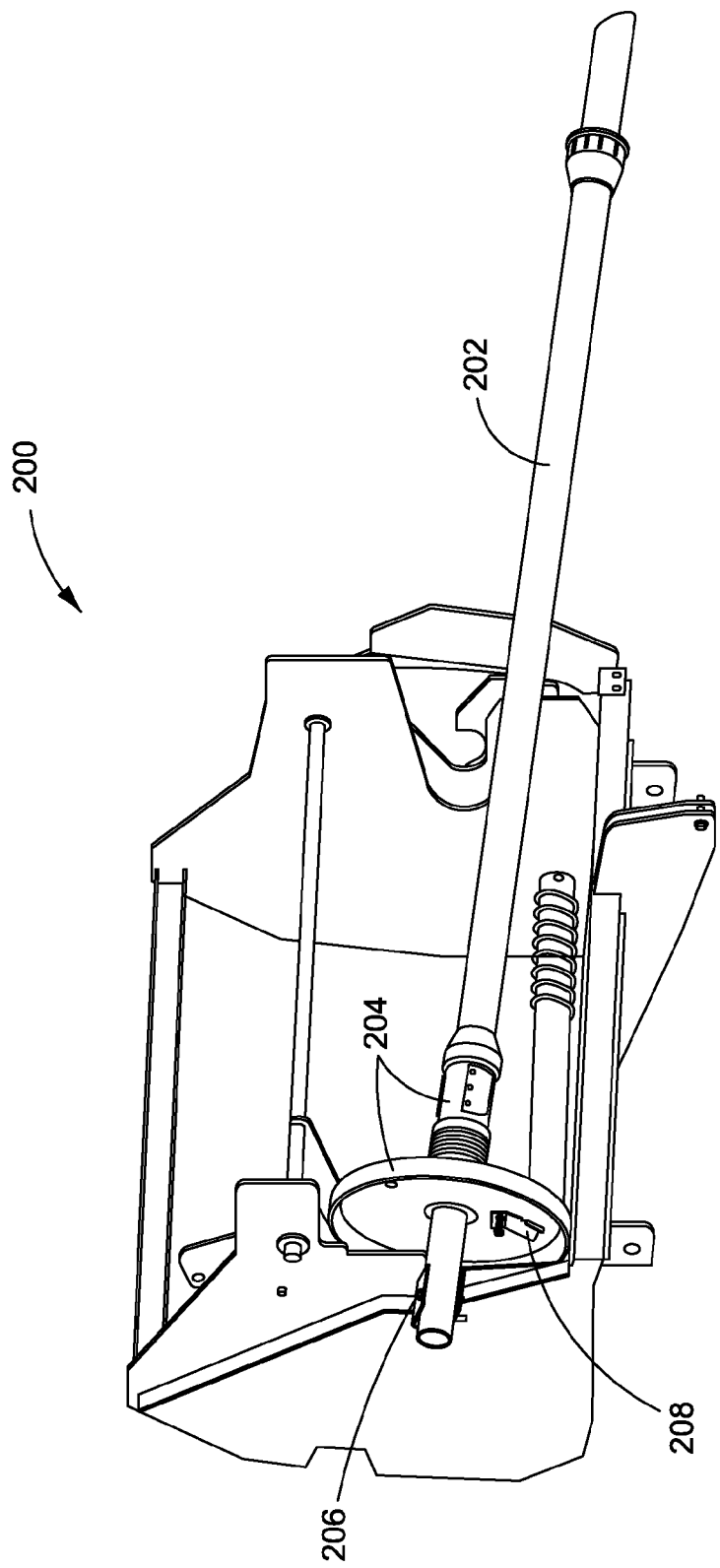
FIG. 3 is a perspective view of the net dispensing assembly shown at FIG. 2 with the net roll support tube in a load-unload position for use with embodiments of the present invention.

FIG. 2 and FIG. 3 are perspective views illustrating different states of an exemplary net dispensing assembly 200. As shown in FIG. 2 and FIG. 3, net dispensing assembly 200 may include a net roll support tube 202 that may be configured to hold a net roll 402 (shown at FIG. 4). Net dispensing assembly 200 may also include a brake drum assembly 204 that is configured to rotate about the net roll support tube 202 and apply tension to net wrapping being dispensed from the net roll 402 during operation. Net dispensing assembly 200 may further include a pivoting element 206 and a locking mechanism 208.

Figure 4:
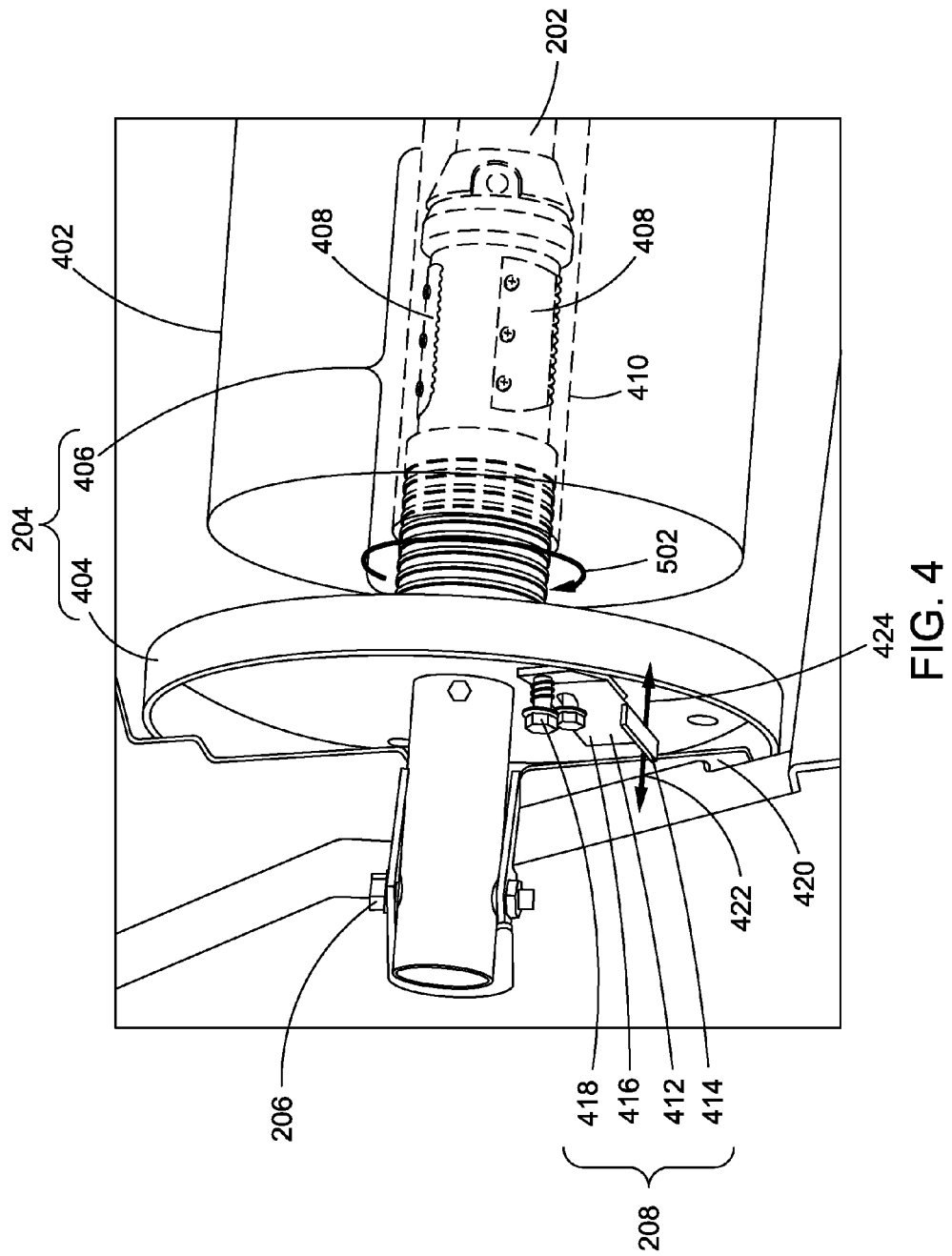
FIG. 4 is a close-up view of an exemplary brake drum assembly and a locking mechanism shown in the load-unload position for use with embodiments of the present invention.

FIG. 4 is a close-up view of the exemplary brake drum assembly and locking mechanism shown in FIG. 2 and FIG. 3. As shown at FIG. 4, brake drum assembly 204 may include a brake drum 404 and a brake drum coupling portion 406. Brake drum coupling portion 406 may include one or more gripping portions 408 configured to grip or hold net roll tube 410. The bale B (shown in FIG. 1) pulls the net wrapping from the net roll tube 410 during wrapping and the brake drum 404 and the net roll 402 rotate about the net roll support tube 202. The brake pad 52 (shown in FIG. 1) presses against the brake drum 404 providing resistance to rotation of the net roll 402 and, consequently, adding tension to net wrapping being dispensed from the net roll 402. The geometry and location of the gripping portions 408 are merely exemplary. Embodiments may include different types of gripping portions configured to couple net roll 402 to net roll support tube 202.

As shown at FIG. 4, locking mechanism 208 may include a latch 412 coupled to the brake drum 404. The latch 412 may include a protrusion 414 extending from a latch base 416. The locking mechanism may also include a spring element 418. As shown in the embodiment at FIG. 4, the latch 412 may be coupled to the brake drum 404. Embodiments may include locking mechanisms fixedly coupled to or removably coupled to the brake drum 404. In some embodiments, locking mechanisms may be integral or unitarily formed with the brake drum 404.

Pivoting element 206 may be configured to move net roll support tube 202 between an operating position and a load-unload position. FIG. 2 shows the net roll support tube 202 in an operating position. FIG. 3 shows the net roll support tube 202 in a load-unload position. The pivoting element 206 shown in the embodiment at FIG. 4 is merely exemplary. Pivoting elements may include different types of mechanical elements, such as hardware (e.g., bolts, nuts, washers and the like).

In the operating position, net wrapping from net roll 402 may be dispensed to a net feeding assembly, such as the net feeding assembly 50 shown at FIG. 1. In the operating position, net wrapping from net roll 402 may be dispensed by rotating the net roll 402 in an operating direction 602 (shown at FIG. 6). In the load-unload position, a net roll tube 410 may be removed from net roll support tube 202 and a net roll 402 may be placed on net roll support tube 202.

Figure 5:
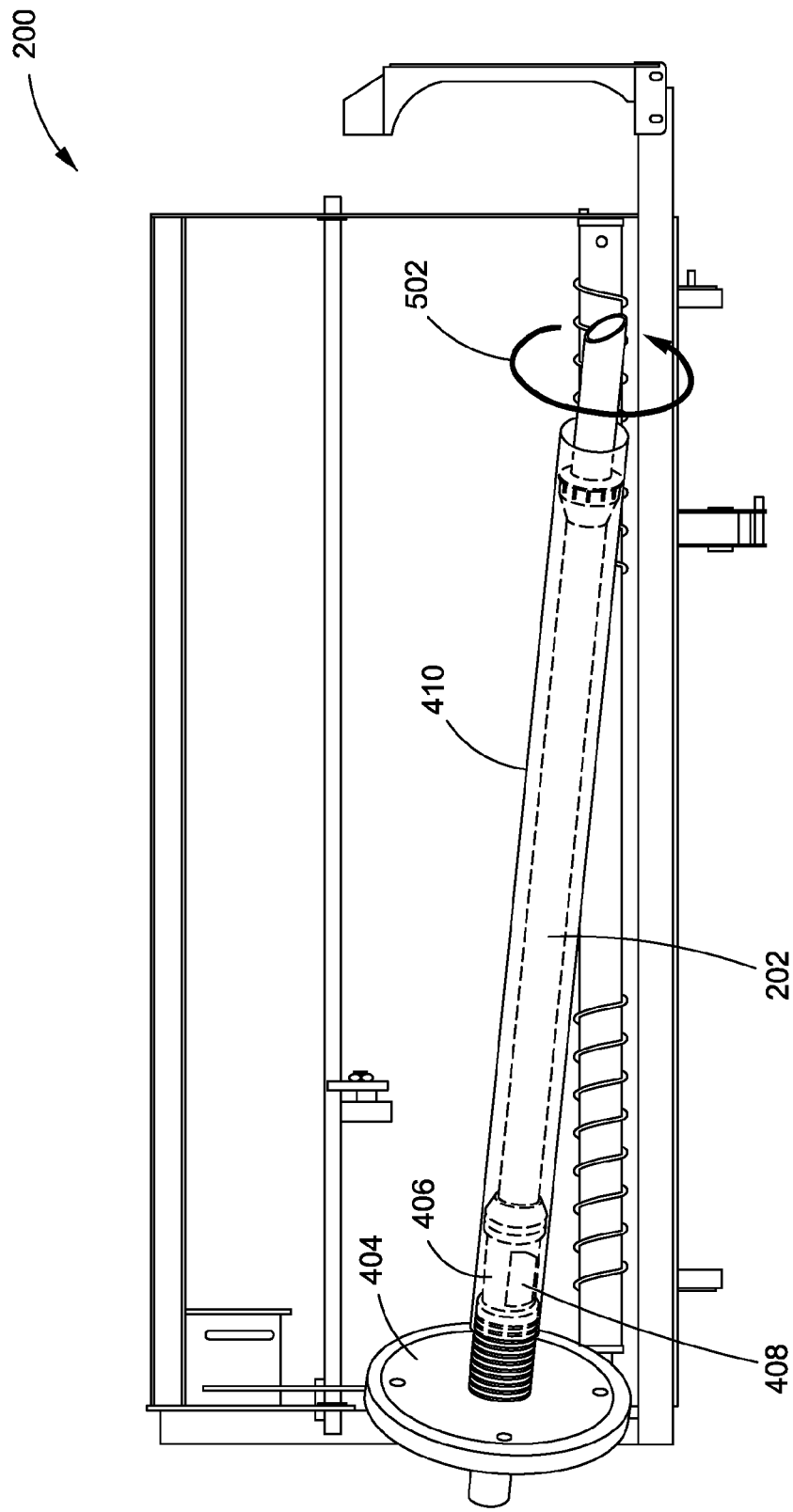
FIG. 5 is a perspective view of the net dispensing assembly with a depleted net roll on the net roll support tube in the load-unload position for use with embodiments of the present invention.

The removal and installation of net rolls is now described in more detail with reference to FIG. 5 through FIG. 7. FIG. 5 is a perspective view of the net dispensing assembly 200 with a depleted net roll on the net roll support tube in the load-unload position. After the net roll 402 has been depleted of net wrapping, the net roll support tube 202 holding the depleted net roll, represented by net roll tube 410 shown at FIG. 5, may be positioned into the load-unload position. Before a replacement net roll 402 (shown in FIG. 6) is placed on the net roll support tube 202, the net roll tube 410 (depleted net roll) is removed (e.g., by an operator) from the net roll support tube 202. In some embodiments, net roll tubes that are not completely depleted may also be removed from net roll support tubes. For example, it may be desired to remove defective net rolls or replace the net rolls with new rolls having different types of wrapping.

Figure 6:
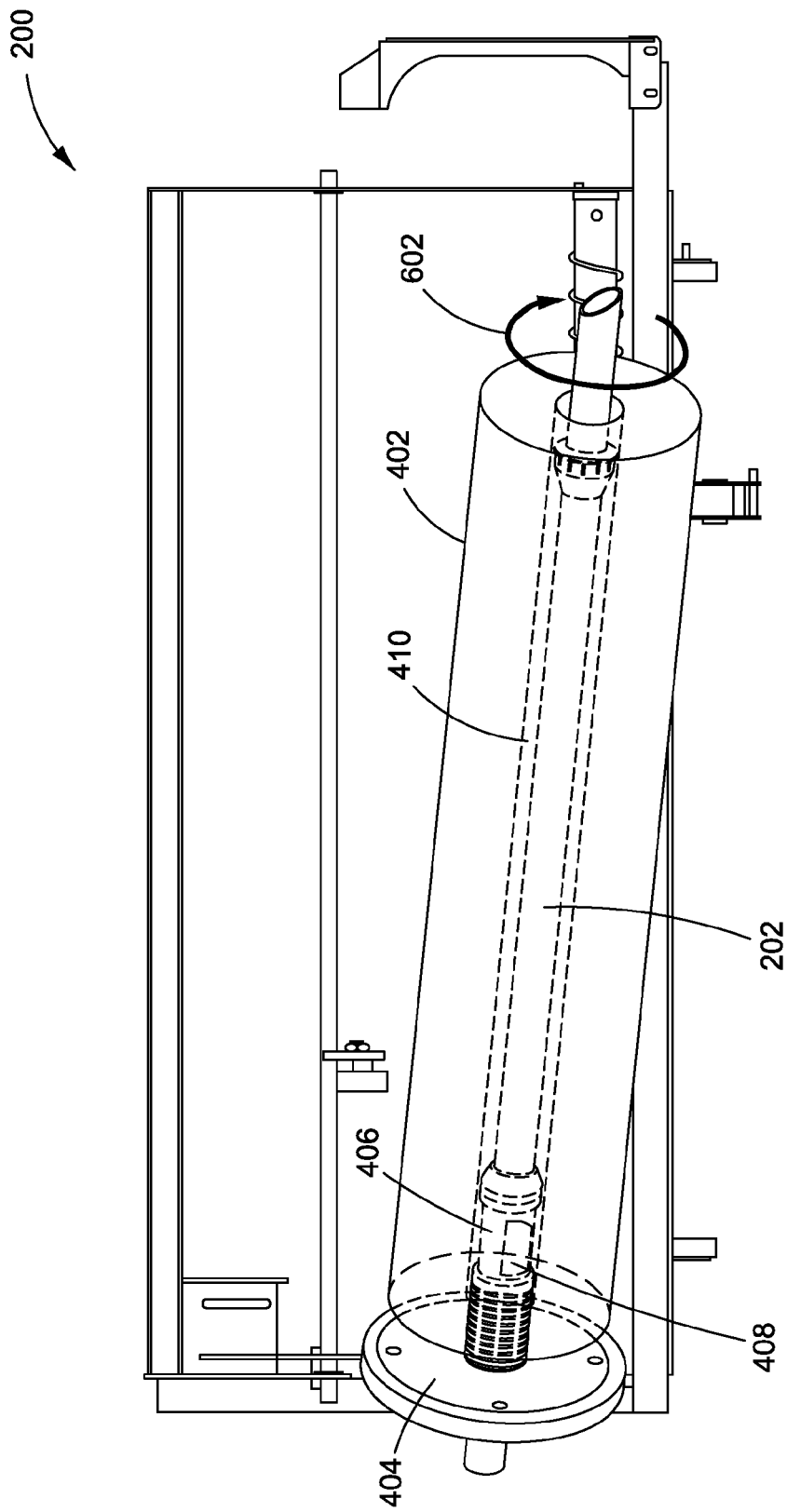
FIG. 6 is a perspective view of the net dispensing assembly with a replacement net roll on the net roll support tube in the load-unload position for use with embodiments of the present invention.

Removal of the net roll tube 410 from the net roll support tube 202 may include disengaging the net roll tube 410 from the gripping portions 408 of the brake drum assembly 204 (shown in FIG. 4) by rotating the net roll tube 410 in a direction 502 (shown at FIG. 4 and FIG. 5) opposite to the operational direction 602 (shown at FIG. 6). To facilitate the removal of the net roll tube 410 from the net roll support tube 202, embodiments of the invention automatically prevent the brake drum assembly 204 and the net roll tube 410 from rotating in the direction 502 when the net roll support tube 202 is in at least one of (i) the load-unload position and (ii) the operating position. That is, some embodiments of the invention automatically prevent the brake drum assembly 204 and the net roll tube 410 from rotating in the direction 502 when the net roll support tube 202 is in the load-unload position. Other embodiments of the invention automatically prevent the brake drum assembly 204 and the net roll tube 410 from rotating in the direction 502 when the net roll support tube 202 is in the operating position. Still other embodiments automatically prevent the brake drum assembly 204 and the net roll tube 410 from rotating in the direction 502 when the net roll support tube 202 is in the load-unload position and when the net roll support tube 202 is in the operating position.

For example, when the net roll support tube 202 is in the load-unload position, locking mechanism 412 may be configured to prevent the brake drum assembly 204 from rotating in the opposite direction 502 of the operating direction 602. When the net roll support tube 202 is in the load-unload position and net roll tube 410 (shown at FIG. 5) is rotated in the direction 502, protrusion 414 (shown at FIG. 4) may automatically engage a stationary portion 420 (shown in FIG. 4) of the net dispensing assembly 200, thereby preventing the brake drum assembly 204 from rotating in the direction 502 and supplying a resistive force to facilitate the removal of the net roll tube 410 from the gripping portions 408. Accordingly, an operator may remove the net roll tube 410 from the gripping portions 408 without having to traverse different sides of the baler.

In some embodiments, the net roll tube 410 may be disengaged or loosened from the gripping portions 408 of the brake drum assembly 204 when the net roll support tube 202 is in the operating position. Accordingly, the brake drum assembly 204 and the net roll tube 410 may be prevented from rotating in the direction 502 to supply the resistive force to facilitate the removal of the net roll tube 410 from the gripping portions 408 when the net roll support tube 202 is in the operating position. After the net roll tube 410 is disengaged or loosened from the gripping portions 408 of brake drum assembly 204 (e.g., by an operator), the net roll support tube 202 may then be moved to the load/unload position to remove the empty net roll 402 from the net roll support tube 202.

In some embodiments, locking mechanism 208 may include a spring element 418 that is configured to apply a spring force to cause protrusion 414 of latch 412 to move in the direction 422 to the position shown at FIG. 4 and engage stationary portion 420. When the brake drum 404 of brake drum assembly 204 rotates in the operational direction 602 (shown at FIG. 6) and protrusion 414 contacts an opposing side (not shown) of the stationary portion 420, a force opposing the spring force may cause the latch to move in the direction 424 and pass stationary portion 420 as the net roll support tube 202 and brake drum assembly 204 continue to rotate in the operating direction. Providing rotation of the net roll support tube 202 and brake drum assembly 204 in the operating direction 602 while in the load-unload position may be advantageous to manually feed net wrapping from net roll 402 (shown at FIG. 6) to the feeding assembly 50 (shown in FIG. 1).

In some embodiments, the opposing side of the stationary portion 420 may be configured (e.g., angled or tapered) to provide the force opposing the spring force and cause the protrusion 422 to move in the direction 424. In some embodiments, opposing sides of the protrusion 422 may be configured differently such that the brake drum assembly 204 are prevented from rotating in direction 502 and brake drum assembly 204 rotate in direction 602 when in the load-unload position.

In some embodiments, latch 412 may be rigid (e.g., not include spring element 418) and configured to engage the stationary portion 420 and the brake drum assembly 204 from rotating in either direction 502 and 602 when the net roll support tube 202 is in the load-unload position. The rigid locking mechanism may automatically disengage from the stationary portion and allow the brake drum assembly to rotate when the net roll support tube is moved a distance away from the load-unload position and allow an operator to feed net wrapping to the feeding assembly 50.

After the net roll tube 410 (depleted net roll) is removed from the net roll support tube 202, a replacement net roll 402 may be placed on net roll support tube 202 and coupled to the brake drum assembly 204 via gripping portions 408. FIG. 6 is a perspective view of the net dispensing assembly 200 illustrating net roll 402 on net roll support tube 202 in the load-unload position. When the replacement net roll 402 is on net roll support tube 202 in the load-unload position, the net roll 402 may be rotated in the operating direction 502 and net wrapping may be fed (e.g., manually by an operator) to the feeding assembly 50 (shown at FIG. 1).

Figure 7:
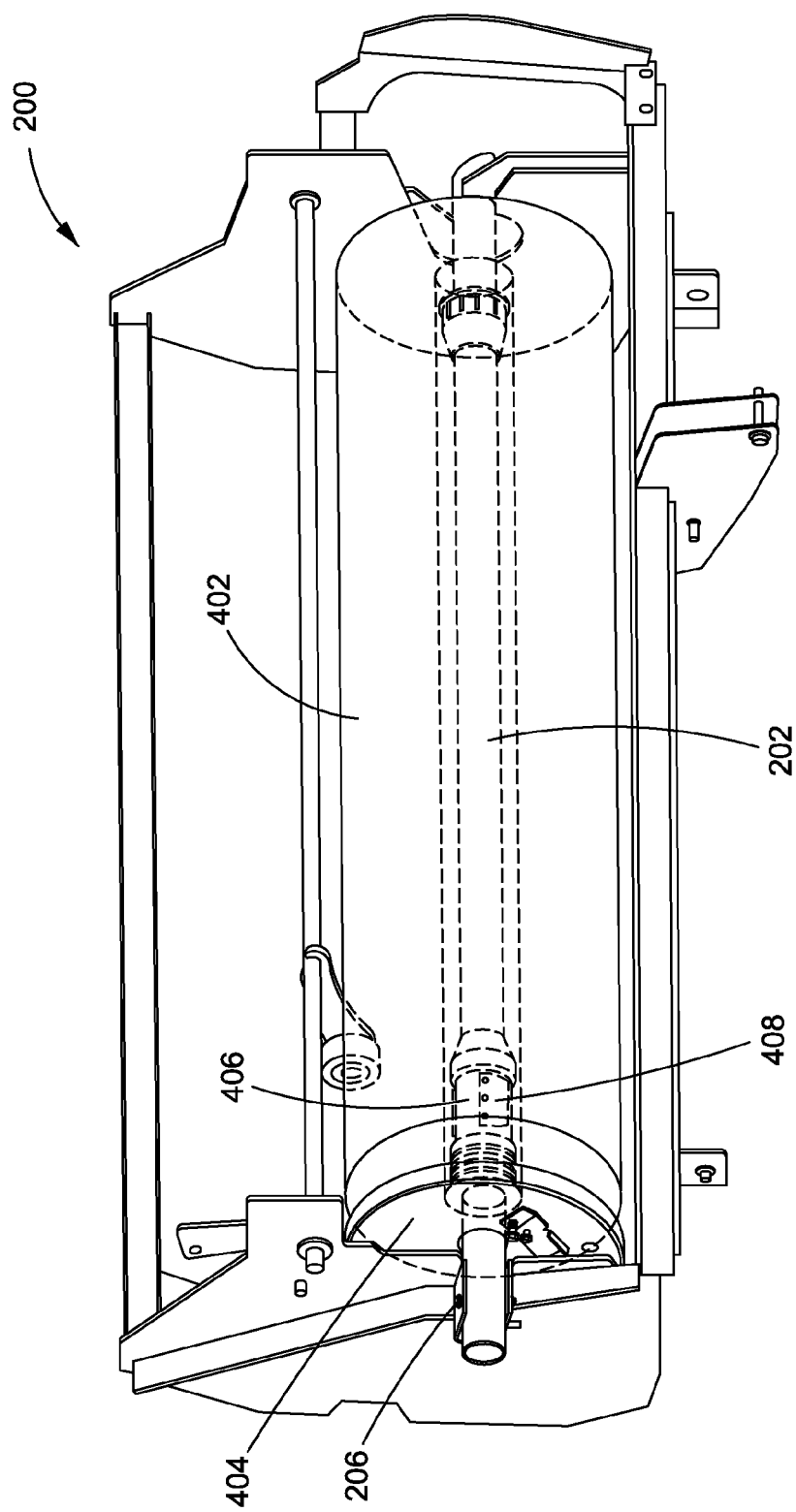
FIG. 7 is a perspective view of the net dispensing assembly with the net roll on the net roll support tube in the operating position for use with embodiments of the present invention.

FIG. 7 is a perspective view of the net dispensing assembly 200 with the net roll 402 on the net roll support tube 202 in the operating position. After a portion of the net wrapping from the replacement roll 402 is fed to the feeding assembly 50 while in the load-unload position, the net roll support tube 202 may be moved to the operating position shown at FIG. 7 via pivoting element 206. While in the operating position, the net roll 402 may be rotated in the operating direction 602 and the net wrapping may be dispensed from the replacement roll 402.

Figure 8:
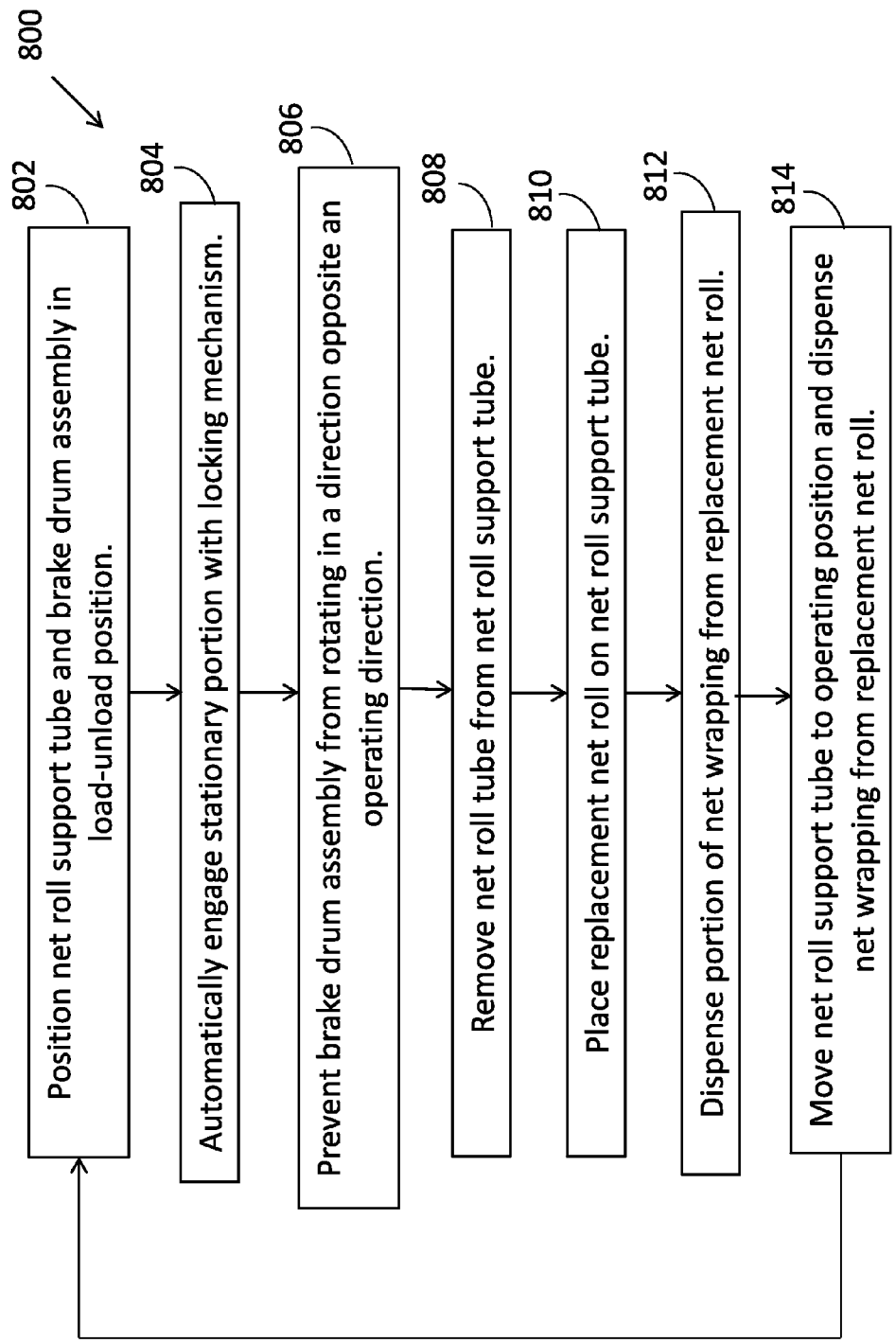
FIG. 8 is a flow chart illustrating an exemplary method of dispensing net wrapping from a net roll for use with embodiments of the present invention.

FIG. 8 is a flow chart illustrating a method 800 of replacing a net roll in a baler. As shown at block 802, the method includes positioning a net roll support tube and brake drum assembly in a load-unload position. For example, net roll support tube 202 and brake drum assembly 204 may be moved from an operating position shown at FIG. 2 and placed into load-unload position shown at FIG. 5. In some embodiments, the net roll support tube 202 that is moved from the operating position may include a net roll tube 410 representing a depleted net roll. In some embodiments described above, prior to moving the net roll support tube 202 to the load-unload position, the brake drum assembly 204 may be prevented from rotating in direction 502 and the net roll tube 410 may be loosened or disengaged from gripping portions 408 while the net roll support tube 202 is in the operating position.

In some embodiments, the net roll tube 410 may be loosened or disengaged from gripping portions 408 while the net roll support tube 202 is in the load-unload position. Accordingly, as shown at blocks 804 and 806, the locking mechanism may automatically engage a stationary portion when the net roll support tube 202 is in the load-unload position and prevent the brake drum assembly from rotating in a direction opposite of the operating direction. For example, when the net roll support tube 202 is in the load-unload position and net roll tube 410 (shown at FIG. 5) is rotated in the direction 502, protrusion 414 (shown at FIG. 4) may automatically engage a stationary portion 420 of the net dispensing assembly 200, thereby preventing the brake drum assembly 204 from rotating in the direction 502 and supplying a resistive force to facilitate the removal of the net roll tube 410 from the gripping portions 408.

At block 808, the net roll tube may be removed from the brake drum assembly and the net support tube when the net roll support tube is in the load-unload position. For example, an operator may remove the net roll tube 410 from the gripping portions 408 by rotating the net roll tube 410 in the direction 502 and slide the net roll tube off of the net roll support tube 202 without having to traverse different sides of the baler.

At blocks 810 and 812, a replacement net roll may be placed on the net roll support tube and a portion of the net wrapping may be dispensed from the replacement net roll 402. For example, replacement net roll 402 may be placed on net roll support tube 202 and coupled to net roll support tube 202 via gripping portions 408. Net roll 402 may then be rotated in the operating direction 602 and net wrapping may be fed (e.g., manually by an operator) to the feeding assembly 50 (shown at FIG. 1).

At block 814, the net roll support tube may be moved to an operating position and net wrapping may be dispensed from the net replacement roll. For example, the net roll support tube 202 may be moved to the operating position shown at FIG. 7 via pivoting element 206. While in the operating position, the net roll tube 402 and brake drum assembly 204 may be rotated in the operating direction 602 and the net wrapping may be dispensed from the replacement roll 402.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A baler comprising:
   a net feeding assembly; and
   a net dispensing assembly configured to dispense net wrapping from a net roll to the net feeding assembly, the net dispensing assembly comprising:
      a net roll support tube configured to hold the net roll;
      a brake drum assembly coupled to the net roll support tube and configured to rotate about the net roll support tube and apply tension to the net wrapping dispensed from the net roll;
      a pivoting element configured to move the net roll support tube between an operating position and a load-unload position; and
      a locking mechanism coupled to the brake drum assembly and configured to prevent the brake drum assembly from rotating in a direction opposite an operating direction when the net roll support tube is in at least one of (i) the load-unload position and (ii) the operating position;
   wherein the locking mechanism comprises a latch coupled to a brake drum on the brake drum assembly and the latch is configured to prevent the brake drum assembly from rotating in the direction opposite the operating direction by engaging a stationary portion of the net dispensing assembly when the net roll support tube is in the load-unload position.

2. The baler of claim 1, wherein the locking mechanism is further configured to provide for rotation of the brake drum assembly in the operating direction when the net roll support tube is in the load-unload position.

3. The baler of claim 1, wherein the latch is configured to automatically engage a portion of the net dispensing assembly frame when the net roll support tube is in the load-unload position.

4. The baler of claim 1, wherein the latch further comprises a protrusion extending from a latch base and the protrusion is configured to engage the stationary portion of the net dispensing assembly to prevent the brake drum assembly from rotating in the direction opposite the operating direction when the net roll support tube is in the load-unload position.

5. The baler of claim 1, wherein the locking mechanism further comprises a spring element configured to apply a spring force to cause the latch to move in a first latch direction and prevent the brake drum assembly from rotating in the direction opposite the operating direction when the net roll support tube is in the load-unload position, and
    the stationary portion of the net dispensing assembly is configured to cause the latch to move in a second latch direction and provide for rotation of the brake drum assembly in the operating direction when the net roll support tube is in the load-unload position.

6. The baler of claim 1, wherein the latch is rigid and is configured to engage the stationary portion and prevent the brake drum assembly from rotating when the net roll support tube is in the load-unload position, and
    the latch is configured to disengage from the stationary portion and allow the brake drum assembly to rotate when the net roll support tube is moved a distance away from the load-unload position.

7. The baler of claim 1, wherein the latch is coupled to the brake drum assembly.

8. The baler of claim 1, wherein the latch is integral with the brake drum assembly.

9. A net dispensing assembly comprising,
    a net roll support tube configured to hold a net roll;
    a brake drum assembly coupled to the net roll support tube and configured to rotate about the net roll support tube and apply tension to the net wrapping dispensed from the net roll;
    a pivoting element configured to move the net roll support tube between an operating position and a load-unload position; and
    a locking mechanism coupled to the brake drum assembly and configured to prevent the brake drum assembly from rotating in a direction opposite the operating direction when the net roll support tube is in at least one of (i) the load-unload position and (ii) the operating position;
    wherein the locking mechanism comprises a latch coupled to a brake drum on the brake drum assembly and the latch is configured to prevent the brake drum assembly from rotating in the direction opposite the operating direction by engaging a stationary portion of the net dispensing assembly when the net roll support tube is in the load-unload position.

10. The net dispensing assembly of claim 9, wherein the locking mechanism is further configured to provide for rotation of the brake drum assembly in the operating direction when the net roll support tube is in the load-unload position.

11. The net dispensing assembly of claim 9, wherein the latch is configured to automatically engage the portion of the net dispensing assembly frame when the net roll support tube is in the load-unload position.

12. The net dispensing assembly of claim 9, wherein the latch further comprises a protrusion extending from a latch base and the protrusion is configured to engage the stationary portion of the net dispensing assembly to prevent the brake drum assembly from rotating in the direction opposite the operating direction when the net roll support tube is in the load-unload position.

13. The net dispensing assembly of claim 9, wherein the locking mechanism further comprises a spring element configured to apply a spring force to cause the latch to move in a first latch direction and prevent the brake drum assembly from rotating in the direction opposite the operating direction when the net roll support tube is in the load-unload position, and
    the stationary portion of the net dispensing assembly is configured to cause the latch to move in a second latch direction and allow the brake drum assembly to rotate in the operating direction when the net roll support tube is in the load-unload position.

14. The net dispensing assembly of claim 9, wherein the latch is rigid and is configured to engage the stationary portion and prevent the brake drum assembly from rotating when the net roll support tube is in the load-unload position, and
    the latch is configured to disengage from the stationary portion and allow the brake drum assembly to rotate when the net roll support tube is moved a distance away from the load-unload position.

15. The net dispensing assembly of claim 9, wherein the latch is fixedly coupled to the brake drum assembly.

16. The net dispensing assembly of claim 9, wherein the latch is integral with the brake drum assembly.

\* \* \* \* \*